US008583729B2

(12) United States Patent
Mousseau et al.

(10) Patent No.: US 8,583,729 B2
(45) Date of Patent: Nov. 12, 2013

(54) HANDLING AN AUDIO CONFERENCE RELATED TO A TEXT-BASED MESSAGE

(75) Inventors: Gary Phillip Mousseau, Waterloo (CA); Eric Ng, Daly City, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 14 days.

(21) Appl. No.: 13/409,632

(22) Filed: Mar. 1, 2012

(65) Prior Publication Data

US 2012/0164998 A1 Jun. 28, 2012

Related U.S. Application Data

(63) Continuation of application No. 13/047,176, filed on Mar. 14, 2011, which is a continuation of application No. 11/072,666, filed on Mar. 4, 2005, now Pat. No. 7,996,463.

(60) Provisional application No. 60/572,866, filed on May 20, 2004.

(51) Int. Cl.
*G06F 15/16* (2006.01)

(52) U.S. Cl.
USPC .......................................................... 709/203

(58) Field of Classification Search
USPC ................................................. 709/203, 204
See application file for complete search history.

(56) References Cited

U.S. PATENT DOCUMENTS

| 6,694,007 B2 | 2/2004 | Lang et al. |
| 6,747,970 B1 | 6/2004 | Lamb et al. |
| 7,233,786 B1 * | 6/2007 | Harris et al. ............... 455/412.1 |
| 2002/0071539 A1 | 6/2002 | Diament et al. |
| 2002/0122391 A1 | 9/2002 | Shalit |
| 2002/0128036 A1 | 9/2002 | Yach |

(Continued)

FOREIGN PATENT DOCUMENTS

| EP | 1484703 | 12/2004 |
| EP | 1569427 | 8/2005 |

(Continued)

OTHER PUBLICATIONS

Rojas, P., "The Engadget Interview: Niklas Zennstrom", Nov. 8, 2004, Retrieved Nov. 16, 2004, from http://www.engadget.com/enty/2635319328796286/, (10 pages).

(Continued)

*Primary Examiner* — Adnan Mirza
(74) *Attorney, Agent, or Firm* — Finnegan, Henderson, Farabow, Garrett & Dunner, LLP

(57) ABSTRACT

A client for a text-based messaging application for a dual-mode mobile communication device may initiate an audio conference based on a text-based message. Contents of fields of the text-based message may be extracted and utilized to construct an audio conference request message that is subsequently transmitted to an audio conference gateway. Where the text-based messaging application is an instant messaging (IM) client application, it may be configured to recognize a voice connection as being related to an ongoing Data Mode IM conversation. As a consequence of the recognition, the IM client application may maintain the user interface for facilitating participation in the Voice Mode IM conversation. Updates related to the status of the Voice Mode IM conversation may be received at the dual-mode mobile communication device over the voice connection and reflected in changes to the user interface.

19 Claims, 13 Drawing Sheets

(56) References Cited

U.S. PATENT DOCUMENTS

| | | |
|---|---|---|
| 2003/0014488 A1* | 1/2003 | Dalal et al. .................. 709/204 |
| 2003/0073430 A1 | 4/2003 | Robertson et al. |
| 2003/0126207 A1 | 7/2003 | Creamer et al. |
| 2004/0034723 A1 | 2/2004 | Giroti |
| 2005/0232166 A1 | 10/2005 | Nierhaus |

FOREIGN PATENT DOCUMENTS

| | | |
|---|---|---|
| EP | 1667388 | 6/2006 |
| EP | 1986141 | 10/2008 |
| GB | 2313251 | 11/1997 |
| GB | 2376608 | 11/2001 |
| WO | WO 00/60809 | 10/2000 |
| WO | WO 02/21816 | 3/2002 |
| WO | WO 02/103967 | 12/2002 |
| WO | WO 2004/110042 | 12/2004 |

OTHER PUBLICATIONS

SkypeOut Frequently Asked Questions, Nov. 11, 2004, Retrieved Nov. 16, 2004, from http://www.skype.com/help/faq/skypeout.html, (7 pages).

Woods, B., "From IM to Audio Conferencing", Apr. 22, 2002, Retrieved Nov. 16, 2004, from http://boston.internet.com/news/print.php/1013561 (2 pages).

Polycom, Inc., "Polycom Delivers Ultimate Desktop Communications Experience with New View Software Application and Conferencing Portal", 2004, Retrieved Nov. 19, 2004, from http://www.polycom.com/common/pw_cmp_printScreen/0,,pw-8174,FF,html, (2 pages).

Polycom, Inc., "Polycom WebOffice Conferencing Portal—Features and Benefits", 2004 (2 pages).

Polycom, Inc., "Polycom WebOffice Conferencing Portal—Frequently Asked Questions", 2004 (4 pages).

Official Communication dated Oct. 27, 2008, in relation to U.S. Appl. No. 11/072,666, filed Mar. 4, 2005 (4 pages).

Official Communication dated Feb. 2, 2009, in relation to U.S. Appl. No. 11/072,666, filed Mar. 4, 2005 (10 pages).

Official Communication dated Aug. 17, 2009, in relation to U.S. Appl. No. 11/072,666, filed Mar. 4, 2005 (12 pages).

Official Communication dated Jun. 22, 2010, in relation to U.S. Appl. No. 11/072,666, filed Mar. 4, 2005 (17 pages).

Official Communication dated Jun. 29, 2011, in relation to U.S. Appl. No. 13/047,176, filed Mar. 14, 2011 (14 pages).

Notice of Allowance dated Dec. 2, 2012, in relation to U.S. Appl. No. 13/047,176, filed Mar. 14, 2011 (5 pages).

Official Communication dated Oct. 30, 2009, in relation to European Patent Application No. 05714585.6 (4 pages).

Official Communication dated Mar. 9, 2010, in relation to Canadian Patent Application No. 2,566,390 (5 pages).

Official Communication dated Mar. 14, 2011, in relation to Canadian Patent Application No. 2,566,390 (3 pages).

* cited by examiner

HANDLING AN AUDIO CONFERENCE RELATED TO A TEXT-BASED MESSAGE

CROSS-REFERENCE TO RELATED APPLICATIONS

This application is a continuation of U.S. application Ser. No. 13/047,176 filed Mar. 14, 2011, which is a continuation of U.S. application Ser. No. 11/072,666 filed Mar. 4, 2005, which claims the benefit of Provisional Application No. 60/572,866 filed May 20, 2004, all of which are hereby incorporated herein by reference.

FIELD OF THE INVENTION

The present invention is directed towards handling audio conferences and, in particular, to handling audio conferences related to text-based messages.

BACKGROUND

Access to Instant Messaging (IM) solutions within computer systems is well known in the field of data communications. It is considered that IM solutions will also be used occasionally on dual-mode mobile communication devices (where "dual-mode" refers to an ability to transmit and receive both data and voice), such as wireless telephones and personal digital assistants (PDAs) with wireless or wired communication capabilities. When interconnected properly, IM solutions may be seen to seamlessly provide an ability to send text messages to both wireless devices and landline devices simultaneously. As the level of integration progresses, the market is demanding better and better services for use with IM applications.

The response of IM software providers to these demands has been to provide enhancements to the IM client application and the IM server that provide, to users of the IM client application, an ability to transmit and receive voice data streams and video data streams to the ability to transmit and receive text data streams within an IM conversation. These enhancements allow two people, each associated with a computing station, in an IM conversation to open a voice and/or video channel associated with the already established data channel connecting the two computing stations. The IM client applications executed at each computing station use a microphone and analog to digital converter to provide audio data to an audio encoder. The IM client application may then open an end-to-end TCP/IP connection to exchange voice packets, encoded by the audio encoders, between the two computing stations. The use a microphone may additionally use a web camera or a digital camera to provide video data to a video encoder. The IM client application may then open a TCP/IP connection between the two computing stations and may send the encoded video data via the TCP/IP connection.

These services may be considered "point-to-point" in nature and may be arranged as such due to a need for scalability and based on a manner in which the servers are constructed. As a result, although multipoint-to-multipoint text-based IM conferences may be arranged, more advanced multipoint-to-multipoint audio and video conferences are not supported by typical IM client applications. There have been some attempts to enhance IM client applications to support multiple-person voice conferences but the attempts have been met with limited success and may not support mobile wireless devices.

To address some of these shortcomings, there are limited solutions that provide digital audio streaming conferencing using standalone conferencing applications. There are also Push-to-Talk conferencing applications that provide limited audio conferencing capabilities to users of mobile communication devices. These audio conferencing applications are not connected to text-based conferencing applications and, therefore, these conferencing applications generally do not share data and/or have relation to one other.

These, and many other, problems maintain a separation between text-based messaging applications (e-mail, instant messaging) and audio conferencing applications. Therefore, there remains an important area of integration between various types of conferencing applications that has not been satisfied for dual-mode mobile communication devices.

SUMMARY

Problems noted above may be overcome and a perceived need for integrated text and audio conferencing may be satisfied through the provision of a client application for a dual-mode mobile communication device. In particular, an audio conference may be initiated based on information associated with a text-based message. Additionally, client application may recognize a recently established voice channel as being related to an ongoing Data Mode IM conversation. A user interface presented by the client application may provide a smooth transition between the Data Mode IM conversation and the Voice Mode IM conversation.

In accordance with an aspect of the present invention there is provided a method of initiating an audio conference. The method includes receiving a text-based message, extracting contents of at least two fields of the text-based message, utilizing the contents to construct an audio conference request message and transmitting the audio conference request message to an audio conference gateway.

In accordance with another aspect of the present invention there is provided, at a mobile communication device, a method of managing a voice connection for an audio conference related to a text-based message. The method includes, presenting a user interface on a display of the mobile communication device, the user interface presenting at least a portion of the text-based message, receiving a voice connection request from an audio conference gateway, responsive to the receiving, establishing a voice connection with the audio conference gateway, receiving data from the audio conference gateway over the voice connection and updating the user interface based on the status information. In other aspects of the invention, a mobile communication device is provided for carrying out this method and a computer readable medium is provided for allowing a processor to carry out this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
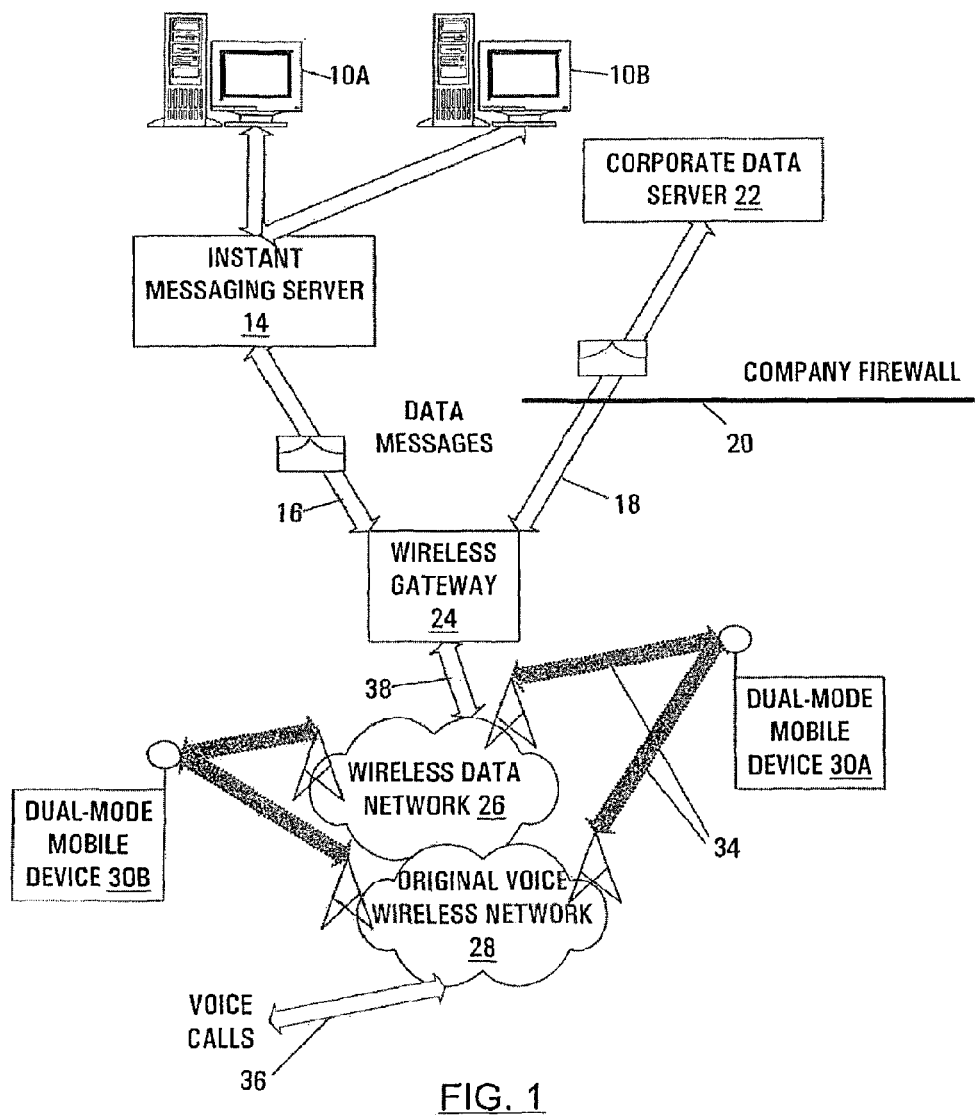
FIG. 1 illustrates a complex network topology in which an embodiment of the present invention may be employed.

With reference to an overview diagram illustrated in FIG. 1, the overview diagram illustrates a representative environment wherein aspects of the invention may be employed. The environment includes an original voice wireless network 28, a wireless data network 26, an instant message (IM) server 14 and a corporate server 22. As illustrated, the corporate server 22 is in a corporate network behind a firewall 20. In the illustration of FIG. 1, a first dual-mode (data and voice) mobile communication device ("dual-mode mobile device") 30A is capable of several means of communication. Three communication options are shown to include a traditional voice communication session 36 via the original voice wireless network 28, a data communication session with the IM server 14 and a data communication session with the corporate server 22. Although the first dual-mode mobile device 30A may perform other data exchanges, the illustrated data communication sessions may be considered representative of data exchanges related to aspects of the present invention.

Additionally, a first landline-based personal computer (PC) 10A and a second landline-based PC 10B are illustrated connecting to the IM server 14.

Although FIG. 1 illustrates the original voice wireless network 28 and the wireless data network 26 as two separate networks to graphically present dual functionality, in many cases the networks 26, 28 are only one network. The data-centric wireless data network 26 may be primarily used to exchange data and the voice-centric original voice wireless network 28 may be primarily used to exchange voice. However, it should be noted that some voice-centric wireless networks can carry data, as in the example of Short Message Services (SMS) over GSM. The newest of these combined networks include, but are not limited to (1) the Code Division Multiple Access (CDMA) network that has been developed and operated by Qualcomm Inc. of San Diego, Calif., (2) the Groupe Special Mobile or the Global System for Mobile Communications (GSM) and the General Packet Radio Service (GPRS), both developed by the standards committee of the Conference of European Posts and Telecommunications Administrations (CEPT), and (3) the future third-generation (3G) networks, like the proposed Enhanced Data Rates for Digital Evolution (EDGE) network and Universal Mobile Telecommunications System (UMTS) network. In an exemplary environment, the GPRS functionality is a data capability that has been implemented overtop of the very popular GSM wireless network operating in virtually every country in Europe.

To facilitate connections between the dual-mode mobile device 30 and land-line-based servers, such as the IM server 14 and the corporate server 22, a wireless gateway 24 may be configured in the connecting path. The portion of the connecting path between the networks 26, 28 and the wireless gateway 24 includes a set of connections illustrated collectively and referenced by reference number 38. As should be clear to a person of ordinary skill in the art, these connections 38 into and out if the networks 26, 28 may be direct or indirect. Where indirect connections may pass through a wide area network, such as the known Internet (not shown) and successors.

The portion of the connecting path between the landline-based servers, i.e., the IM server 14 and the corporate server 22, and the wireless gateway 24 includes IM server physical connections 16 and corporate server physical connections 18. As should be clear to a person of ordinary skill in the art, these connections 16, 18 may also be direct or indirect and may use a range of existing technologies including, but not limited to, Ethernet, Cable Modem, Digital Subscriber Line (DSL), Integrated Services Digital Network (ISDN) and Frame Relay over any number of digital transmission links, such as an electrical T1 link or optical fiber. These connections 16, 18 are commonly deployed over wide-area networks like the Internet.

The wireless gateway 24 may be configured to provide a range of functions to assist in coupling the first dual-mode mobile device 30A to landline-based services. Functions in such a range of functions may include, but are not limited to: the provision of Network Address Translation (NAT) type services for dealing with private, dynamically assigned IP addresses in the wireless network; the provision of special transport mechanisms for delivering data to dual-mode devices; the provision of a mechanism to bridge through corporate firewalls using only outgoing connections or Virtual Private Network-type services; the provision of protocol conversion to allow connection of dual-mode devices to IM services such as those associated with the known America On-Line (AOL) Instant Messenger (AIM) program, the known ICQ program and the known Microsoft™ MSN Messenger program; the provision of a push-type service in the wireless gateway 24 to delivery data in a timely manner to dual-mode devices; and the provision of a mechanism to bridge dissimilar networks, or networks in different countries that would normally not be linked. The latter function may be configured to allow users to roam between countries and still have access to landline data services.

In the exemplary network of FIG. 1, a first IM participant at the first dual-mode mobile device 30A, with an embedded IM client application, may participate in a Data Mode IM conversation with a second IM participant at a second dual-mode mobile device 30B, with an embedded IM client application, and with a third IM participant at the first landline-based PC 10A. The first dual-mode mobile device 30A and the second dual-mode mobile device 30B (individually or collectively 30) may be considered to be identical in both hardware and software but may be differentiated in that the first dual-mode mobile device 30A initiates the Data Mode IM conversation and the second dual-mode mobile device 30B accepts an invitation to join the Data Mode IM conversation. Communication to the first landline-based PC 10A may be facilitated by the wireless gateway 24, in conjunction with the IM server 14, which may link millions of IM users like the third IM participant at the first landline-based PC 10A.

Data communication between the first IM participant at the first dual-mode mobile device 30A and the second IM participant at the second dual-mode mobile device 30B may be facilitated in several ways. Data may be routed through the wireless gateway 24 to the IM server 14. Alternatively, the data may be routed through the wireless gateway 24 between the first dual-mode mobile device 30A and the second dual-purpose mobile device 30B. As will be recognized by one skilled in the art, there are even further routing choices, including a direct Internet Protocol-to-Internet Protocol (IP-to-IP) address exchange made possible in those wireless networks 26 that allow for direct IP packet exchanges.

Figure 2:
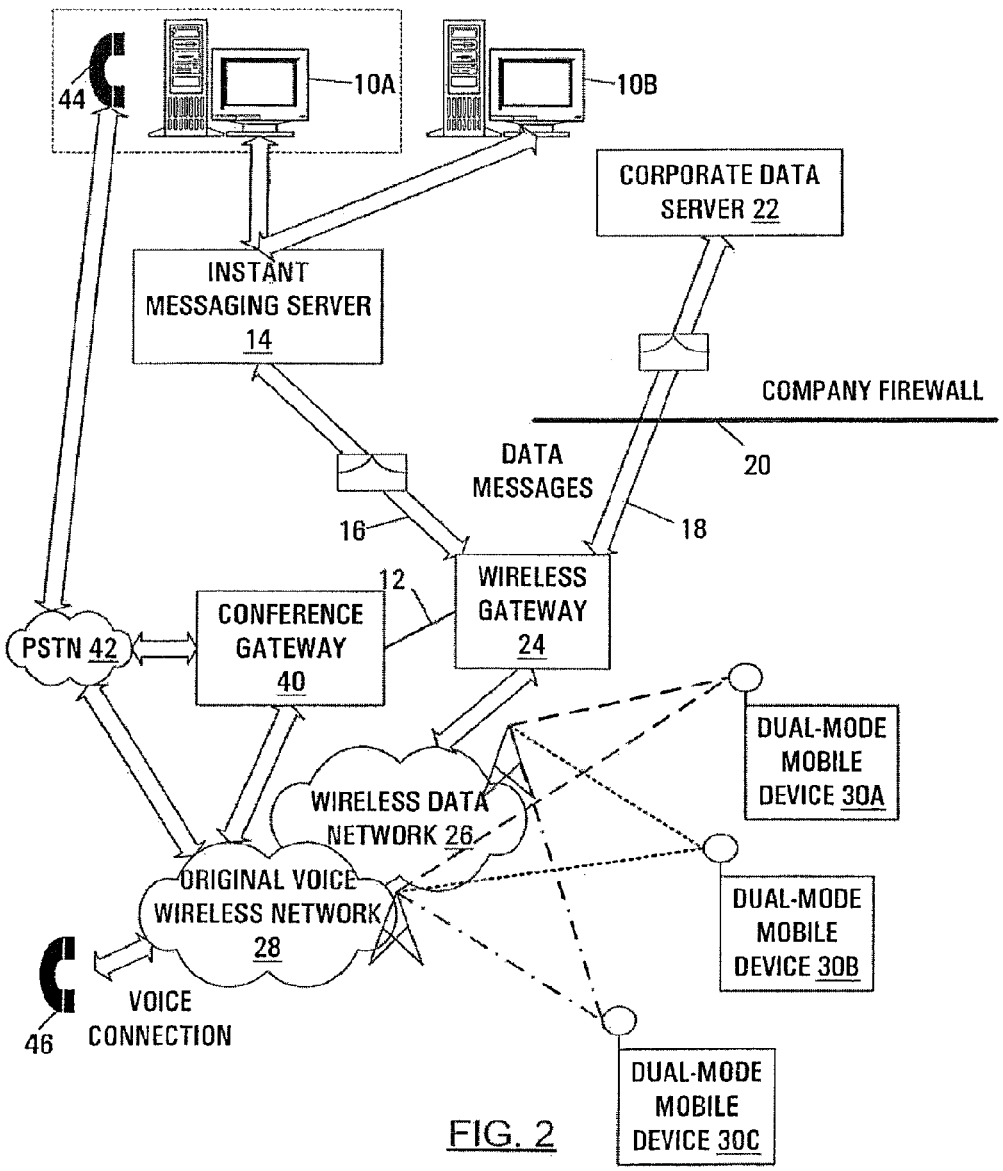
FIG. 2 illustrates the complex network topology of FIG. 1 with additional conference components.

Turning now to FIG. 2, an audio conference gateway 40 has been added to the system presented in FIG. 1, wherein the audio conference gateway 40 is in communication with the wireless gateway 24 over gateway a physical connection 12. The physical connection 12 may, for instance, be a Transmission Control Protocol/Internet Protocol (TCP/IP) link, either on a Local Area Network or a Wide Area Network. Alternatively, the physical connection 12 may be an Application Program Interface link, with similarities to a Private Branch Exchange link, where calls are made for services. The audio conference gateway 40 may also be in communication with a public switched telephone network (PSTN) 42 and the original voice wireless network 28. Many possibilities exist for the location of the audio conference gateway 40 including a location in close proximity to the wireless gateway 24, a location in the corporate network behind the firewall 20 or in many other locations across a wide area network like the Internet and successors.

An exemplary landline telephone station apparatus 44 is illustrated connected to the PSTN 42 and an exemplary mobile telephone station apparatus 46 is illustrated connected to the original voice wireless network 28. The exemplary landline telephone station apparatus 44 may be considered to be associated with the first landline-based PC 10A.

The dual-mode mobile devices 30A, 30B are joined by a third dual-mode mobile device 30C (collectively or individually 30) and are shown in FIG. 2 to be in communication with both the wireless data network 26 and the original voice wireless network 28. As will be appreciated by those skilled in the art, these networks 26, 28 are shown as two but may generally be implemented at one single base station with dual functionality to receive and transmit voice traffic or data traffic depending on the mode of the dual-mode mobile devices 30. In a GPRS network, a device known as a "Class B" device is capable of voice or data communications, but not both simultaneously. A device known as a "Class A" device is capable of both voice and data simultaneously. In a UMTS network, all devices are capable of both voice and data communications at any time.

Through the original voice wireless network 28, the audio conference gateway 40 may be capable of reaching the exemplary mobile telephone station apparatus 46, and other normal cellular (mobile wireless) handsets, to establish voice connections. Through the PSTN 42, the audio conference gateway 40 may be capable of reaching the exemplary landline telephone station apparatus 44.

It is anticipated that, as is typical, the dual-mode mobile devices 30 may be capable of switching from a data communications-based application to a voice communications-based application, depending on the needs of the user operating the dual-mode mobile device 30. Such flexibility allows for the management, by a novel IM client application, of a dynamic and flexible IM conversation experience for the user as detailed in FIG. 3.

In overview, a user of a dual-mode mobile device may pass along to a user of another dual-mode device, with whom he wishes to communicate, contact information comprising an indication of his IM data access address and his telephone directory number. A user of a desk-top landline-based PC 10, who also has a phone also on the desk-top, may similarly pass along, to a user of a dual-mode mobile device with whom he wishes to communicate, such contact information, namely, an indication of his IM data access address and the telephone directory number for the desk-top phone. Each IM data access address may be in the form of an IM account user name. This contact information may be passed to a dual-mode mobile device electronically in the same way as "contact" cards are currently passed between data communication devices. The user of the recipient dual-mode mobile device may associate the contact information from various sources together to create groups. The recipient dual-mode mobile device may also store a data address of an audio conference gateway. This address may be pushed to the dual-mode mobile device from the audio conference gateway, for example, in an SMS message or an e-mail message.

A user may use an IM client application to select a group to initiate a Data Mode IM conversation in a conventional manner. That user may, thereafter, through a user interface provided by the IM client application, request a Voice Mode IM conversation (an audio conference) with the group. This request causes the dual-mode mobile device to utilize its stored audio conference gateway address to send a request to this audio conference gateway along with the telephone directory number of each member in the group. The audio conference gateway may then send an invitation to each group member. This invitation may be an IM data message ("Do you want to join a voice call?"). Alternatively, may directly attempt to establish a voice connection to each device represented by the telephone directory numbers.

For dual-mode mobile devices incapable of supporting simultaneous data and voice sessions, the data session is suspended when the voice connection is established. For dual-mode mobile devices that can support simultaneous data and voice sessions, the data session need not be suspended when the voice connection is established. For either type of dual-mode mobile device, the voice connection may be assumed to relate to the existing Data Mode IM conversation if the incoming invitation is seen to be from an audio conference gateway.

During an audio conference, the audio conference gateway may use low volume DTMF signaling to pass data messages to dual-mode mobile devices incapable of supporting simultaneous data and voice sessions.

Figure 3:
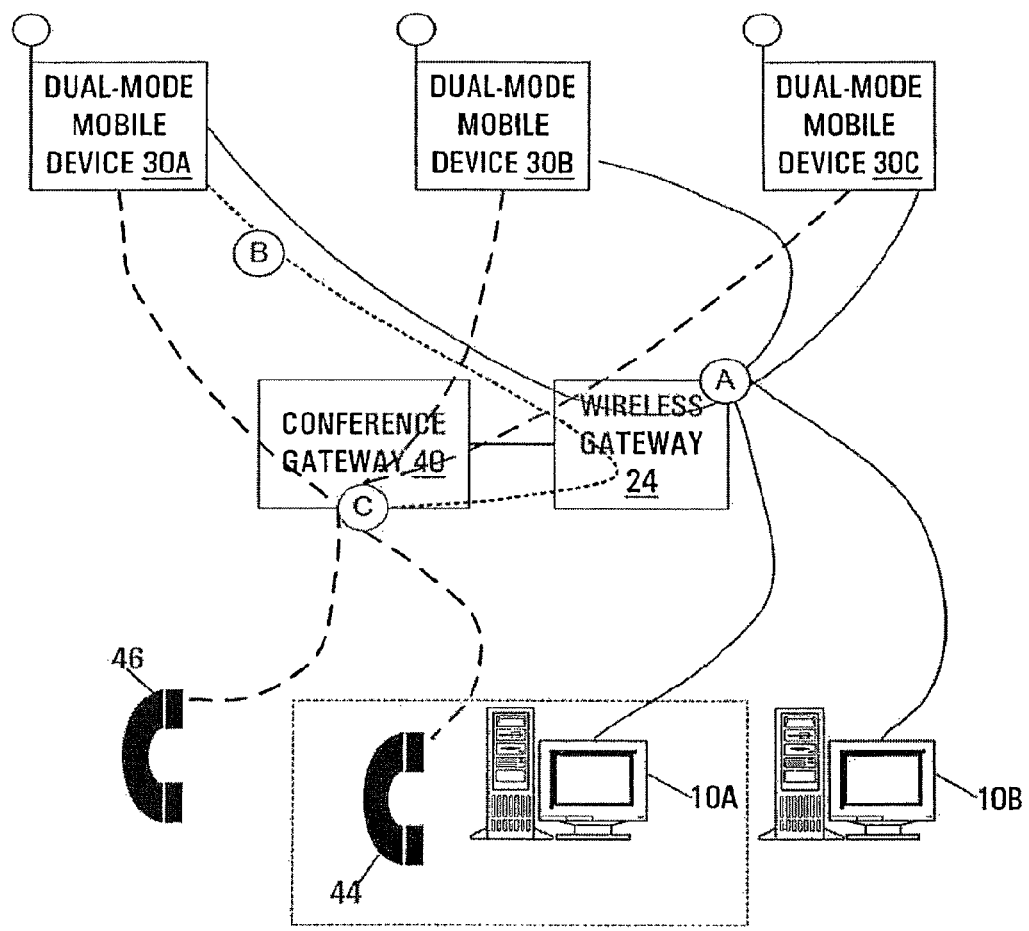
FIG. 3 illustrates data and connection flow among selected elements of the network topology of FIG. 2 according to an embodiment of the present invention.

FIG. 3 illustrates an overview of data and connection flow within the system of FIG. 2 when employing aspects of the invention. In this simplified example, the first IM participant at the first dual-mode mobile device 30A initiates an original Data Mode IM conversation with four other IM participants. These include the second IM participant at the second dual-mode mobile device 30B, the third IM participant at the first landline-based PC 10A, a fourth IM participant at the second landline-based PC 10B and a fifth IM participant at the third dual-mode mobile device 30C. This first step, an IM conversation initiation step, is labeled (A). During the original Data Mode IM conversation, the five stations exchange data communications facilitated by the wireless gateway 24, by the IM server 14 and other network components as described in FIGS. 1 and 2.

At some point in time in the original Data Mode IM conversation, a requestor, i.e., one of the participants, in this case, the Data Mode IM conversation initiator (the first IM participant at the first dual-mode mobile device 30A), may request a change in the mode of the IM conversation from Data Mode to Voice Mode. To affect the mode change, the requestor may be required to send a mode change request data packet to the audio conference gateway 40. The mode change request data packet may, as illustrated for the first IM participant at the first dual-mode mobile device 30A, be sent to the audio conference gateway 40 through the wireless gateway 24. For the purposes of sending such change request data packets to the audio conference gateway 40, a data network address for the audio conference gateway 40 may be known to the IM client application executed on the dual-mode mobile device 30. This second step, an IM conversation mode change request step, is labeled (B) in FIG. 3.

The mode change request data packet may be configured to contain a list of references (e.g., telephone directory numbers) to voice-mode capable devices associated with potential IM conversation participants to be invited to the Voice Mode IM conversation. The references to devices in a mode change request data packet may include those summarized in the following table:

| Group Member | Data Mode device? | Address of Data Mode device | Voice Mode device? | Address of Voice Mode device | DTMF Capable? |
|---|---|---|---|---|---|
| First | Y | 207.196.85.74 | Y | 416-555-2398 | Y |
| Second | Y | 207.196.85.63 | Y | 416-555-5076 | Y |
| Third | Y | 98.252.141.30 | Y | 905-555-5514 | Y |
| Fifth | Y | 207.196.85.18 | Y | 416-555-3036 | Y |
| Sixth | N | | Y | 519-555-0037 | Y |

To configure the mode change request data packet, the IM client application may consult a database of contact information stored on the dual-mode mobile device 30. Based on an associated between the identity of each member of the group and a corresponding record in the database, the IM client application may extract information from the corresponding record for use in configuring the mode change request data packet.

Responsive to receiving the mode change request data packet from the first dual-mode mobile device 30A, the audio conference gateway 40 may parse the mode change request data packet to determine a telephone directory number for each of the voice-mode capable devices to be invited to the Voice Mode IM conversation. The audio conference gateway 40 may then initiate a voice connection to each of the voice-mode capable devices referenced in the mode change request data packet. This third step, a voice connection initiation step, is labeled (C) in FIG. 3.

In FIG. 3, the audio conference gateway 40 may initiate a voice connection to the first dual-mode mobile device 30A (associated with the first IM participant), the second dual-mode mobile device 30B (associated with the second IM participant), the exemplary landline telephone station apparatus 44 (associated with the third IM participant at the first landline-based PC 10A), the third dual-mode mobile device 30C (associated with the fifth IM participant) and the exemplary mobile telephone station apparatus 46 (not associated with participant in the Data Mode IM conversation, due to lack of a Data Mode capable device).

As illustrated in FIG. 3, the fourth IM participant at the second landline-based PC 10B is not included in the Voice Mode IM conversation due to lack of a Voice Mode capable device. However, the third IM participant at the first landline-based PC 10A may be included in the Voice Mode IM conversation by virtue of an association with a Voice Mode capable device in the form of the exemplary landline telephone station apparatus 44. Furthermore, it is anticipated that one skilled in the art will be able to determine how to bridge a voice connection to the second landline-based PC 10B directly using the known session initiation protocol (SIP) or the known H.323 protocol, so that the fourth IM participant at the second landline-based PC 10B may be included in the Voice Mode IM conversation.

Once the initiation of the voice connections is complete, the audio conference gateway 40 may bridge the voice connections thereby allowing the original Data Mode IM conversation to have been instrumental in the creation of a conference call, which may be thought of as a Voice Mode IM conversation related to the original Data Mode IM conversation.

FIGS. 4A, 4B, 5A, 5B, 6, 8A, 8B and 9 illustrate sample user interface screens for dual-mode mobile devices in a variety of states. The user interface screens may be, for instance, presented by a mobile IM client application, exemplary of aspects of the invention, executed on an exemplary one of the dual-mode mobile devices 30.

Figure 4A:
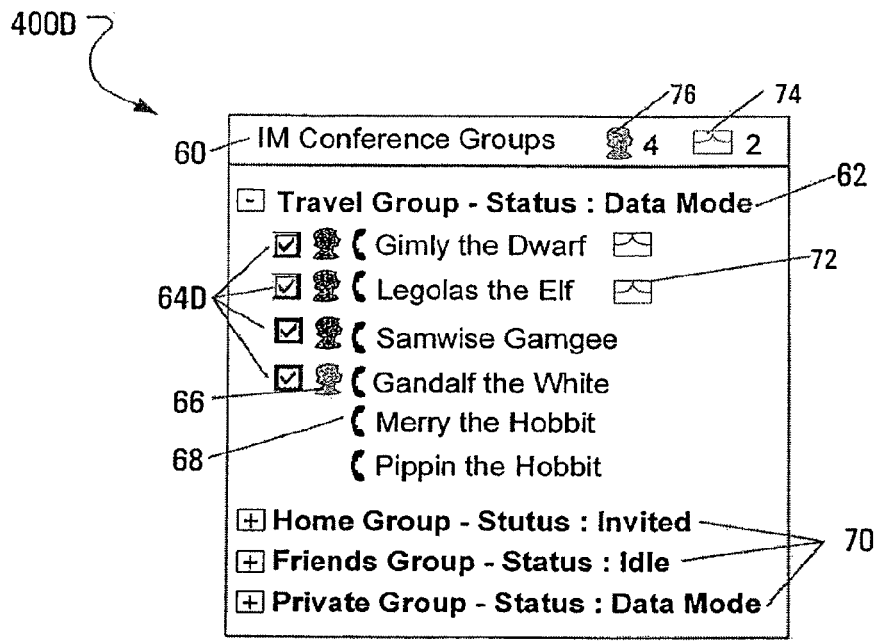
FIG. 4A illustrates an exemplary IM Conference Groups user interface screen according to an embodiment of the present invention.

FIG. 4A illustrates a Data Mode IM Conference Groups status user interface screen 400D for the mobile IM client application, where a user is participating in an ongoing Data Mode IM conversation. As the display area of typical dual-mode mobile device 30 is small, the amount of information that can be displayed in a user interface screen may be considered to be very limited. As illustrated in FIG. 4A, the user interface screen includes a title line 60, an expanded group name line 62, several collapsed group name lines 70, four Data Mode check box indicators 64D, a little person icon 66, a little phone icon 68, an unread message status indicator 72, an unread message count 74 and a group size indicator 76.

The title line 60 may indicate a title for the particular user interface screen being presented within the IM client application, i.e., the Data Mode IM Conference Groups status screen 400D. It is known that IM client applications may allow for the definition of several groups (e.g., family, friends, coworkers, etc.), where each group includes a reference to members of the group, where each member is a person that may be reached using the IM client application. Each group is identified on one of the group name lines 62, 70, where references to the members of the group identified on the expanded group name line 62 are displayed and references to the members of the group identified on the collapsed group name lines 70 are hidden. As is familiar in many applications, selection of a boxed minus sign on the expanded group name line 62 may collapse the named group such that the references to the members are hidden. Additionally, selection of a boxed plus sign may expand the named group such that references to the members are displayed.

The group name lines 62, 70 may also provide an indication of the status of the named group. In the example of the expanded group name line 62, the group is indicated as being in "Data Mode". The groups named in the collapsed group name lines 70, the groups are indicated as being in "Invited" mode, in "Idle" mode and in "Data Mode". There may be many possible modes and a full list is not provided in here, however, a representative set might include: Inviting, Invited, Accepting, Accepted, Data Mode, Voice Mode, Idle, Closing and Closed.

In addition to references to the members of the group identified on the expanded group name line 62, various status indicators are associated with the references to the members so that an indication of the activity in the ongoing Data Mode IM conversation may be inferred at a quick glace. Each Data Mode check box indicator 64D may be used to indicate that the member, the reference to which the Data Mode check box indicator 64D is associated, is a participant in the ongoing Data Mode IM conversation. The little person icon 66 may be used to indicate that the member, the reference to which the little person icon 66 is associated, is associated with a data-mode capable device and can, therefore, participate in a Data Mode IM conversation. The little phone icon 68 may be used to indicate that the member, the reference to which the little phone icon 68 is associated, is associated with a voice-mode capable device and can, therefore, participate in a Voice Mode IM conversation.

The member may be considered to be associated with a data-mode capable device where the reference to the member is associated with an IM account user name. The member may be considered to be associated with a voice-mode capable device where the reference to the member is associated with a telephone directory number. Such an association between the member and an IM account user name and/or a telephone directory number may be provided directly by the member to the user of the dual-mode mobile device 30. Once provided, the association may be stored on the dual-mode mobile device 30 for use by the IM client application.

Alternatively, responsive to the IM client application logging onto the IM server 14, the IM client application may receive such associations from the IM server 14, along with an indication of the members of the group that are also logged onto the IM server 14.

The unread message status indicator 72 may be used to indicate that the member, the reference to which the unread message status indicator 72 is associated, has contributed a message to the ongoing Data Mode IM conversation and that the contributed message has yet to be read by the user of the IM client application.

The unread message count 74 may appear on the title line 60 and indicate a number of messages that have been contributed to the ongoing Data Mode IM conversation that have yet to be read by the user of the IM client application. The group size indicator 76 may also appear on the title line 60 and indicate a number of participants in the ongoing Data Mode IM conversation.

Figure 4B:
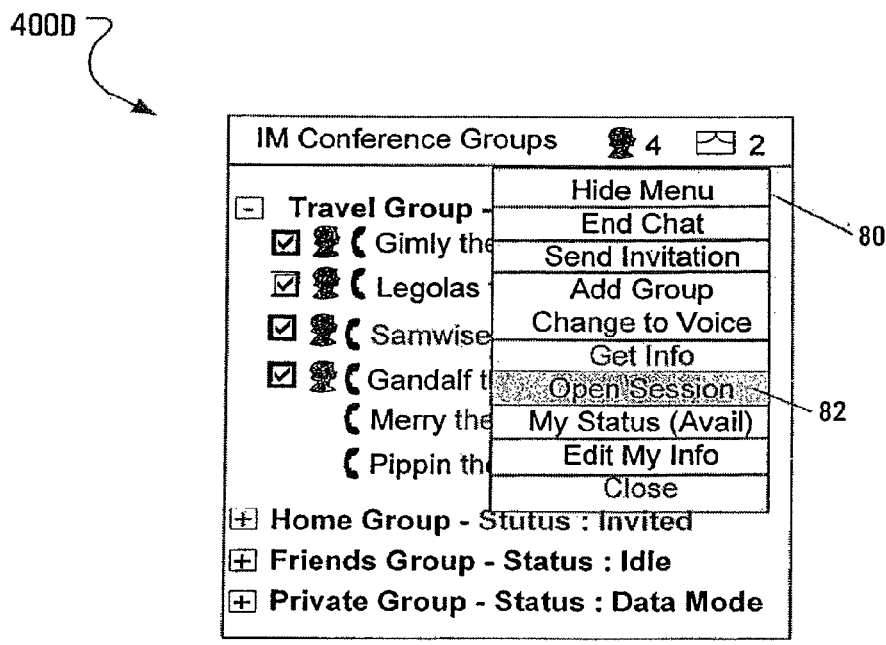
FIG. 4B illustrates the exemplary IM Conference Groups user interface screen of FIG. 4A with an additional menu according to an embodiment of the present invention.

The Data Mode IM Conference Groups status screen 400D is again illustrated in FIG. 4B, with the addition of a user-invoked "Groups screen menu" 80. The Groups screen menu 80 may provide many options to the user, including an "Open Session" option 82, selection of which may cause the IM client application to open a Data Conference screen to allow the user to view messages contributed to the ongoing Data Mode IM conversation.

Figure 5A:
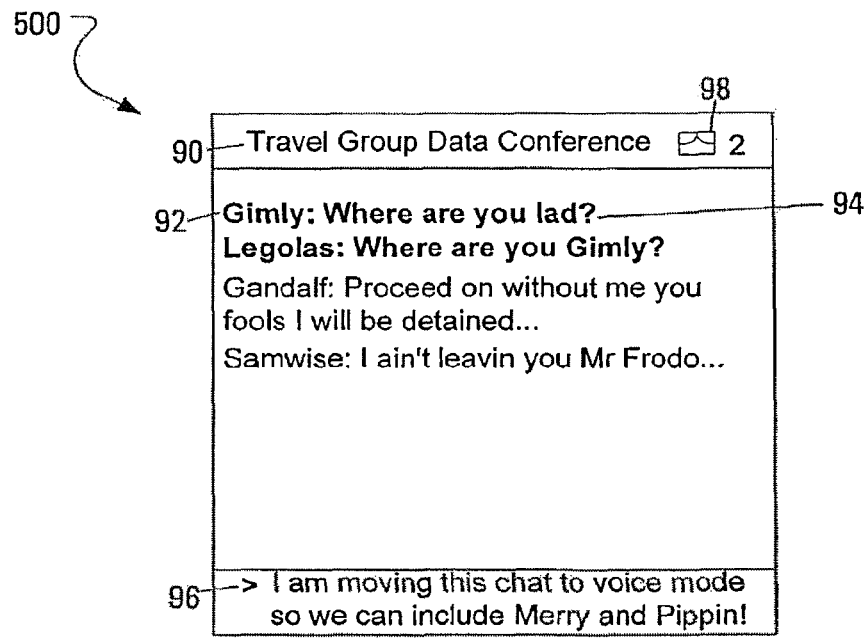
FIG. 5A illustrates an exemplary Travel Group Data Conference user interface screen according to an embodiment of the present invention.

FIG. 5A illustrates a Data Conference user interface screen 500 for the Travel Group. The Data Conference screen 500 includes a title line 90, a message window with messages 94 associated with a indication 92 of the member that contributed the message, an input area 96 and an unread message count 98.

The title line 90 may indicate a title for the particular user interface screen being presented within the IM client application, i.e., the Travel Group Data Conference screen 500. Within the message window, messages 94 may be associated with the indication 92 of the member that contributed the message. Messages 94 and corresponding member indications 92 may be presented in bold type where the messages have been contributed since the user last opened the Travel Group Data Conference screen 500. As is common in IM client applications, each time a member contributes a message to the ongoing Data Mode IM conversation, each participant in the ongoing Data Mode IM conversation may view the message in a corresponding message window. At the bottom of the exemplary Travel Group Data Conference screen 500, the input area 96 may provide the user with a place to compose a message.

The unread message count 98 may appear on the title line 90 and indicate a number of messages that have been contributed to the ongoing Data Mode IM conversation that have yet to be read by the user of the IM client application.

According to the message being composed in the input area 96, the user is about to indicate to the other IM conversation participants that a Voice Mode IM conversation is about to be initiated. Advantageously, members of the Travel Group that do not have access to a device capable of a Data Mode IM conversation may be included in the soon-to-be-initiated Voice Mode IM conversation (i.e., conference call).

Figure 5B:
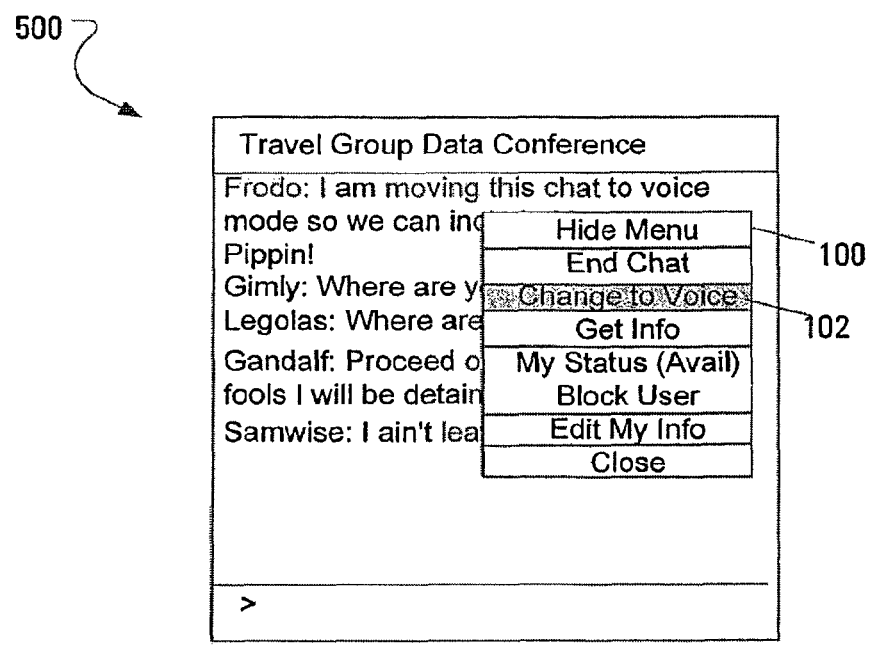
FIG. 5B illustrates the exemplary Travel Group Data Conference user interface screen of FIG. 5A with an additional menu according to an embodiment of the present invention.

The Travel Group Data Conference screen 500 is again illustrated in FIG. 5B, with the addition of a user-invoked "Conference screen menu" 100. The Conference screen menu 100 may provide many options to the user, including an "Change to Voice" option 102, selection of which may cause the IM client application to formulate a mode change request data packet and to send the mode change request data packet through the wireless gateway 24 to the audio conference gateway 40 (see FIG. 3). Notably, the Groups screen menu 80 (FIG. 4B) may also provide a "Change to Voice" option.

As discussed above, the mode change request data packet may be configured to contain a list of references to voice-mode capable devices associated with the members of the Travel Group. Responsive to receiving the mode change request data packet, the audio conference gateway 40 may send an invitation to each of the voice-mode capable devices associated with the members of the Travel Group to invite the members to join a Voice Mode IM conversation related to the ongoing Data Mode IM conversation.

Responsive to receiving an indication that a given member of the Travel Group has accepted the invitation, the audio conference gateway 40 may attempt to establish a voice connection to the voice-mode capable device associated with the given member. Alternatively, the invitation to join Voice Mode IM conversation may take the form of the attempt, by the audio conference gateway 40, to establish a voice connection to the voice-mode capable device associated with the given member.

According to aspects of this invention, as voice connections are established to the voice-mode capable devices associated with the members of the group, the ongoing Data Mode IM conversation is not affected or disrupted. However, in the case wherein the voice-mode capable device with which a voice connection is established is a Class B dual-mode mobile device, the data connection in use by the Class B dual-mode mobile device is suspended for the duration of the Voice Mode IM conversation. As such, the user of the Class B dual-mode mobile device is unable to contribute to the ongoing Data Mode IM conversation.

According to aspects of the invention, the IM client application executed on the dual-mode mobile device 30 may be configured to manage a transition from participation in a Data Mode IM conversation to participation in a Voice Mode IM conversation so that the relationship between the Data Mode IM conversation and the Voice Mode IM conversation is clear. To this end, subsequent to the establishment of the voice connection to the dual-mode mobile device 30, the IM client application may manage the subtle change from the Data Mode version of the IM Conference Groups status screen 400D, illustrated in FIG. 4A, to the Voice Mode version of the IM Conference Groups status screen 400V, illustrated in FIG. 6.

Figure 6:
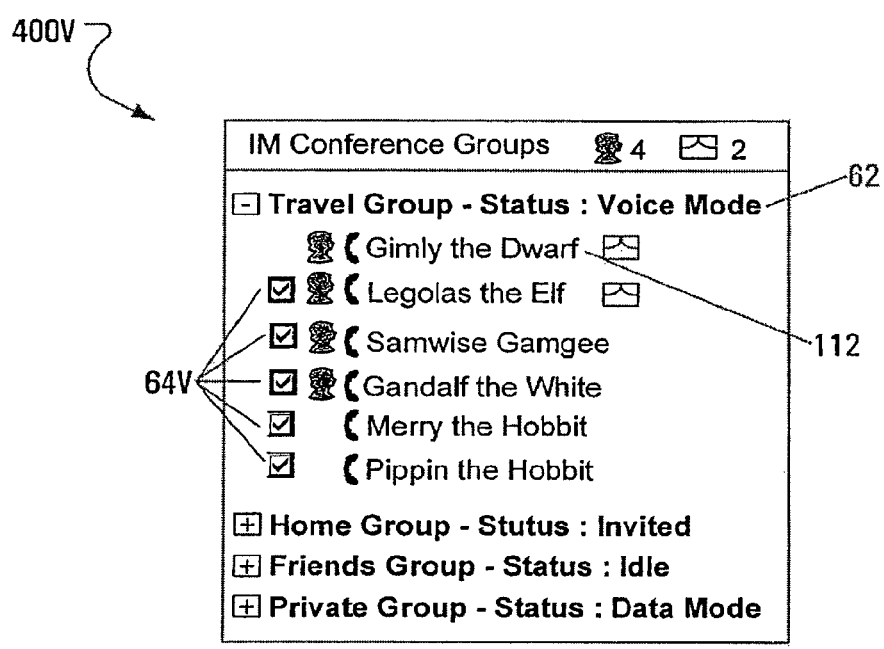
FIG. 6 illustrates the IM Conference Groups user interface screen of FIG. 4A after the initiation of a change from Data Mode to Voice Mode, according to an embodiment of the present invention.

FIG. 6 illustrates the Voice Mode version of IM Conference Groups status screen 400V, subsequent to the establishment of the voice connection to the dual-mode mobile device 30. The expanded group name line 62 indicates that the status of the Travel Group is now Voice Mode, rather than Data Mode as illustrated in FIG. 4A. Five Voice Mode check box indicators 64V may be used to indicate that the members, the references to which the Voice Mode check box indicators 64V are associated, are participants in the ongoing Voice Mode IM conversation. Notably, the member referenced by numeral 112 is not associated with a Voice Mode check box indicator 64V. Such a lack of Voice Mode check box indicator 64V may indicate that the member referenced by numeral 112 has not yet accepted the invitation to join the ongoing Voice Mode IM conversation. The voice-mode capable device associated with the member referenced by numeral 112 may, for instance, have been configured to prompt the member before any accepting a mode change.

The Voice Mode check box indicators 64V may be, as illustrated, indistinguishable from the Data Mode check box indicators 64D. In such a case, the meaning of a given check box indicator may be derived by reviewing the expanded group name line 62 for an indication of the mode (Data or Voice) of the IM conversation. Alternatively, distinguishable indicators may be employed. For instance, a "D" character may be used to indicate that the member, the reference to which the "D" character is associated, is a participant in an ongoing Data Mode IM conversation and a "V" character may be used to indicate that the member, the reference to which the "V" character is associated, is a participant in an ongoing Voice Mode IM conversation.

Figure 7:
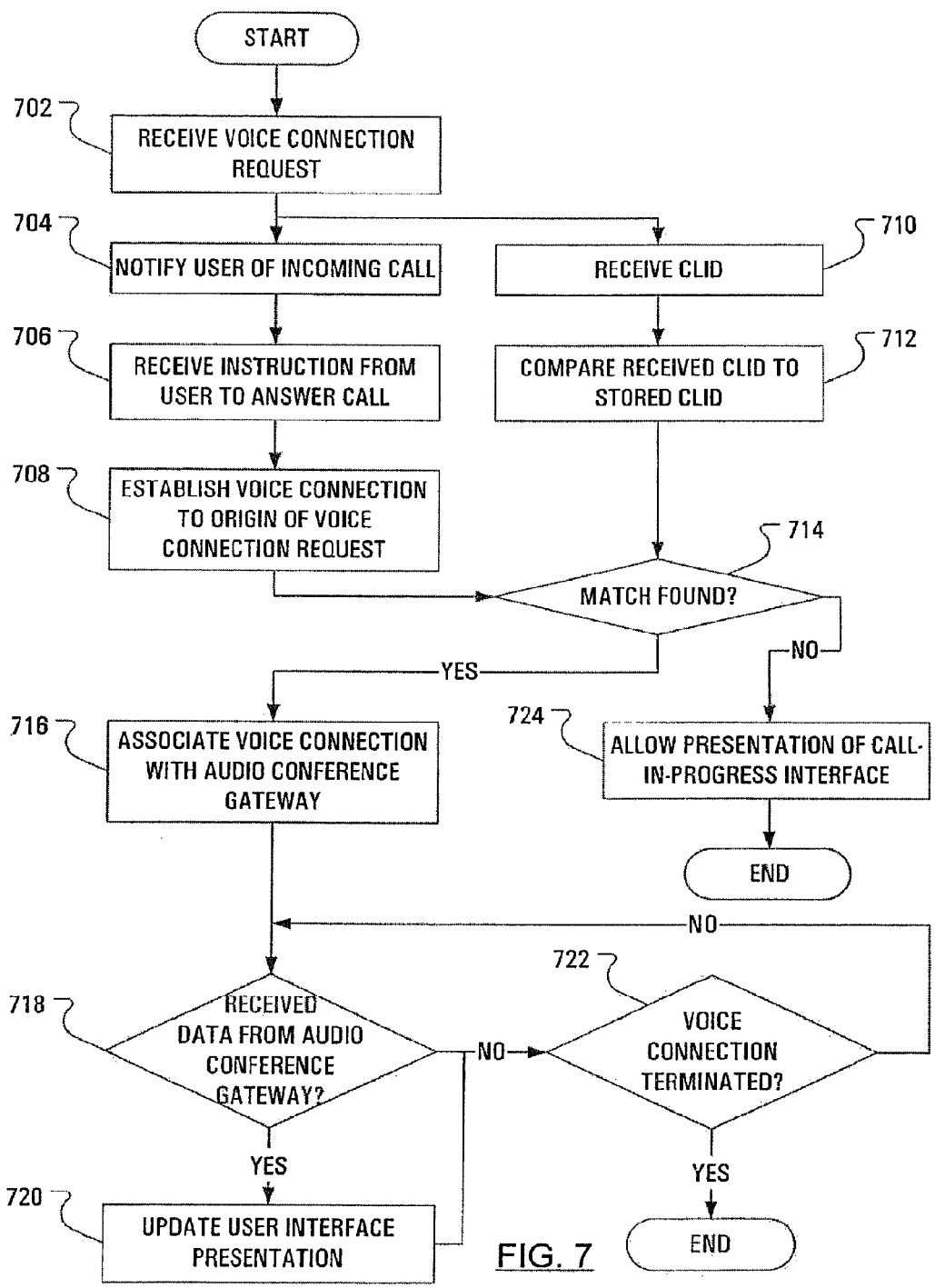
FIG. 7 illustrates steps in a voice connection management method executed at a dual-mode mobile communication device according to an embodiment of the present invention.

A method of managing a voice connection at a dual-mode mobile device 30 presenting a user interface for a Data Mode IM conversation is presented in FIG. 7. Intermediate steps between the presentation, by the IM client application, of the Data Mode version of the IM Conference Groups status screen 400D, illustrated in FIG. 4A, and the presentation of the Voice Mode version of the IM Conference Groups status screen 400V, illustrated in FIG. 6, may begin with the receipt (step 702) of a voice connection request. The IM client application may then notify (step 704) the user of the dual-mode mobile device 30 that a call is incoming, i.e., that a voice connection request has been received. The user may then indicate, to the IM client application, a desire to answer the incoming call, i.e., a desire to establish a voice connection with the audio conference gateway 40. Responsive to receiving the indication (step 706), the IM client application may cause the dual-mode mobile device 30 to establish a voice connection with the audio conference gateway 40 (step 708). In other words, the incoming call is answered. Additionally, the IM client application may receive calling line identification (CLID) information (step 710) included as part of the voice connection request that led to the notification (STEP 704) of the user of the dual-mode mobile device 30 that a call was incoming. The IM client application may compare (step 712) the received CLID information to stored CLID information related to the audio conference gateway 40. Based on the comparison determining a match (step 714) between the received CLID information and the stored CLID information, the IM client application may recognize that the voice connection request has originated at the audio conference gateway 40 (step 716).

Recognizing that the voice connection request has originated at the audio conference gateway 40 may be required as the IM client application determines whether the incoming voice connection is likely to be related to the ongoing Data Mode IM conversation, in which case the user interface should be maintained, or whether the incoming voice connection is likely to be unrelated to the ongoing Data Mode IM conversation, in which case the user interface may be suspended to allow presentation (step 724) of a typical "call-in-progress" user interface specific to the dual-mode mobile device 30.

Subsequent to associating (step 716) the voice connection with the audio conference gateway 40, the dual-mode mobile device 30 may determine (step 718) that data has been received from the audio conference gateway 40, for instance, an indication of an identity of a group with which to associate the voice connection. The IM client application may use the received data to update the user interface (step 720), for instance, the received identity may be used to associate the voice connection with the identified group. The association of the established voice connection with a group may serve to indicate, to the IM client application, that the identified group has switched from Data Mode to Voice mode. The IM client application may then change the status of the identified group accordingly. For example, in the case illustrated in FIG. 6, the status of the Travel Group, displayed on the expanded group name line 62, has been changed to "Voice Mode".

Assuming a Class B dual-mode mobile device 30, the IM client application may suspend the data connection that allowed participation in the Data Mode IM conversation and, as a consequence, clear the Data Mode check box indicators 64D. The dual-mode mobile device 30 may also receive an indication, from the audio conference gateway 40, of members of the group to which voice connections have been established. The IM client application may use this indication to update the status of the members of the group. In the case illustrated in FIG. 6, the status of five of the six group members has been updated to include Voice Mode check box indicators 64V.

The indication of the identity of the group to associate with a recently established voice connection and the indication of the group members to which voice connections have already been established may be transmitted by the audio conference gateway 40 to the dual-mode mobile device 30 using Dual Tone Multi-Frequency (DTMF) signaling. This may be referred to as a DTMF "back channel". That is, the audio conference gateway 40 may produce brief, barely audible sounds that may be easily ignored by the user of the dual-mode mobile device 30, yet understood as data by the IM client application such that the data may be interpreted and used to update the Voice Mode version of the IM Conference Groups status screen 400V.

Subsequent to updating the user interface, or in the event that no data has recently been received from the audio conference gateway, the IM client application may determine whether the voice connection has been terminated (step 722). Where the voice connection has been terminated, the method of managing the user interface in the presence of a voice connection may be considered complete, even though the data connection may be resumed and the Data Mode IM conversation may be continued. Where the voice connection has not been terminated, monitoring the voice connection (step 718) for data received from the audio conference gateway may continue.

It should be clear, to one of ordinary skill in user interface and configuration management, that providing for automatic or manual acceptance of a mode change in a dual-mode mobile device may be considered straightforward. Rather than a mode change invitation, a participant in the Data Mode IM conversation may simply receive a telephone call as the audio conference gateway 40 attempts to establish a voice connection to each voice-mode device equipped group member.

Figure 8A:
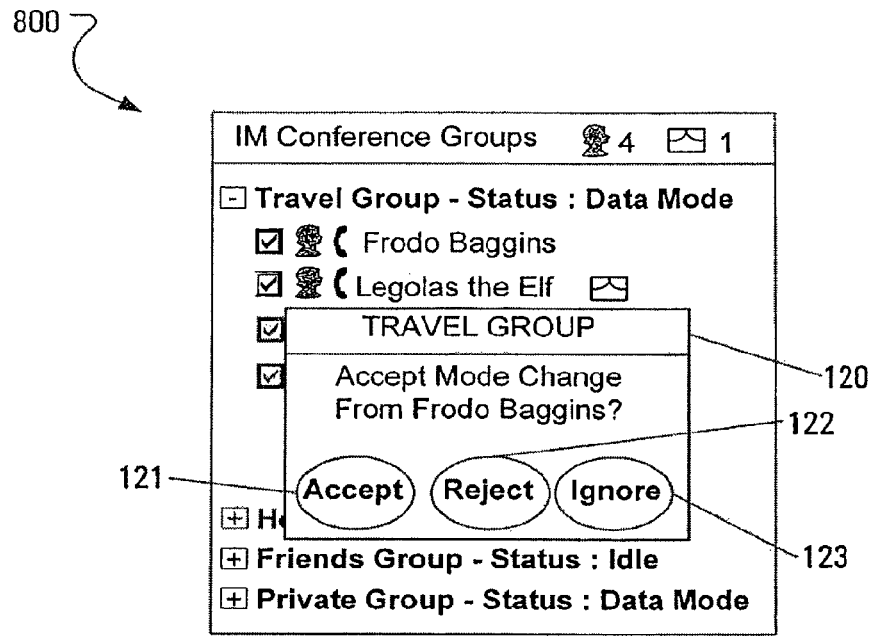
FIG. 8A illustrates a IM Conference Groups user interface screen on a device associated with a conference participant distinct from the conference participant associated with the IM Conference Groups user interface screen of FIGS. 4A, 4B and 6.

FIG. 8A illustrates a IM Conference Groups status screen 800 on the device associated with the member referenced by numeral 112 in FIG. 6. Responsive to receiving, from the audio conference gateway 40, an invitation to join the ongoing IM conversation in Voice Mode, the IM client application executed on the device associated with the member referenced by numeral 112 in FIG. 6 may present a mode change invitation dialog box 120 to indicate that an invitation to join the ongoing IM conversation in Voice Mode has been received. The mode change invitation dialog box 120 may present an "Accept" button 121, a "Reject" button 122 and an "Ignore" button 123, thereby allowing the member to allow, reject or ignore the invitation. Responsive to one of the buttons 121, 122, 123 being selected, a response to the invitation that indicates the selection is sent, by the IM client application executed on the device associated with the member referenced by numeral 112 in FIG. 6, to the audio conference gateway 40.

Upon receiving an indication that the Accept button 121 has been selected by a given member, the audio conference gateway 40 may attempt to establish a voice connection to a suitable device associated with the member in the mode change request data packet.

When a voice connection has been established associated with given member, the IM Conference Groups status user interface screen 800 may be updated to indicate that the given member is part of the Voice Mode IM conversation being established. Additionally, the group name line of the IM Conference Groups status screen 800 may be updated to indicate the Voice Mode and the group size indicator on the title line may be updated to indicate the number of participants in the Voice Mode IM conversation.

As discussed above, for Class B dual-mode mobile devices, the IM Conference Groups status screen may be managed by the IM client application to indicate a status change from Data Mode to Voice Mode for the group related to which a voice connection has been established. Additionally, updates to the status of members of the group related to the voice connection may be received from the audio conference gateway 40 in-band, i.e., over the established voice connection.

For Class A dual-mode mobile devices, which can manage a voice connection simultaneously with a data connection, updates to the status of various members of the groups as the members join the Voice Mode IM conversation may be received from the audio conference gateway 40 in a variety of ways. For instance, when a voice connection has been established to a Class A dual-mode mobile device (or Class B dual-mode mobile device), the updates may be provided in-band using DTMF signaling. Alternatively, and without regard for whether a voice connection has been established, the updates may be provided to a Class A dual-mode mobile device out-of-band using the pre-existing data connection. That is, even before joining the Voice Mode IM conversation, the user of the Class A dual-mode mobile device may be allowed to determine which members of the group have joined the Voice Mode IM conversation.

Upon receiving an indication that the Reject button 122 has been selected by a given member, the audio conference gateway 40 may take no further action relative to the given member. The given member may continue to monitor the ongoing Data Mode IM conversation. However, once the members that accept the invitation to join the Voice Mode IM conversation (also known as a teleconference, an audio conference or a conference call), there may be very little traffic on the ongoing Data Mode IM conversation.

Upon receiving an indication that the Ignore button 123 has been selected by a given member, the audio conference gateway 40 may consider that the given member is presently unavailable to participate in the Voice Mode IM conversation but anticipates availability in a short time. In response, the audio conference gateway 40 may wait a predetermined waiting period and, at the expiry of the waiting period, resend the invitation to the voice-mode capable device associated with the given member. While not yet participating in the Voice Mode IM conversation, the given member may continue to monitor the ongoing Data Mode IM conversation. However, once the members that accept the invitation to join the Voice Mode IM conversation, there may be very little traffic on the ongoing Data Mode IM conversation.

Figure 8B:
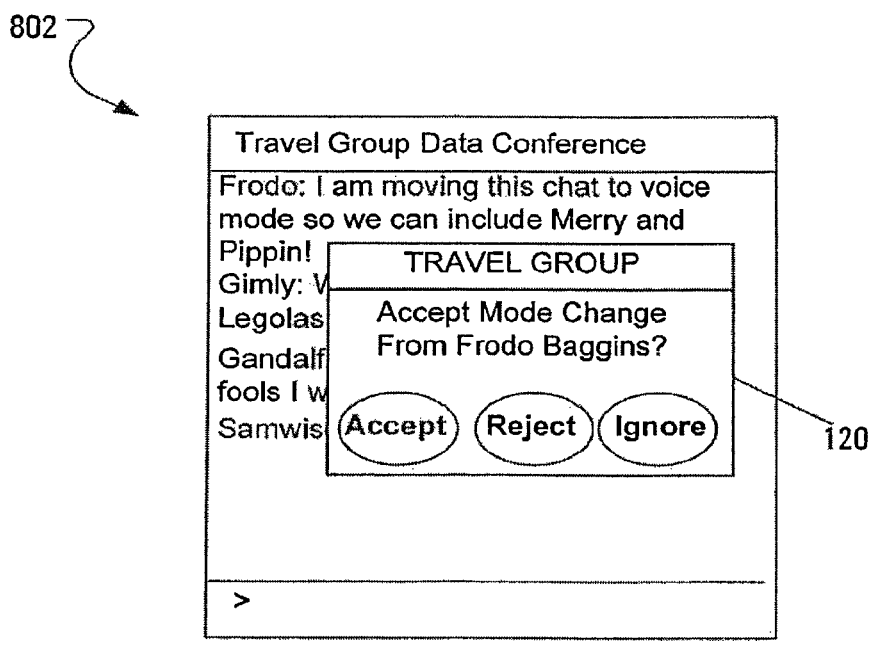
FIG. 8B illustrates a Travel Group Data Conference user interface screen associated with the conference participant with which the device displaying the IM Conference Groups user interface screen of FIG. 8A is also associated.

Although, in FIG. 8A, the mode change invitation dialog box 120 has been presented by the IM client application while presenting the IM Conference Groups status screen 800, a dialog box may equally have been presented by the IM client application while presenting a Data Conference screen. To illustrate this point, a Travel Group Data Conference screen 802 is illustrated in FIG. 8B for the device associated with the member referenced by numeral 112 in FIG. 6. As illustrated in FIG. 8B, the IM client application has presented the mode change invitation dialog box 120 to indicate that an invitation has been received to join the ongoing IM conversation in Voice Mode. In particular, the mode change invitation dialog box 120 has been presented over the Travel Group Data Conference screen 802.

Figure 9:
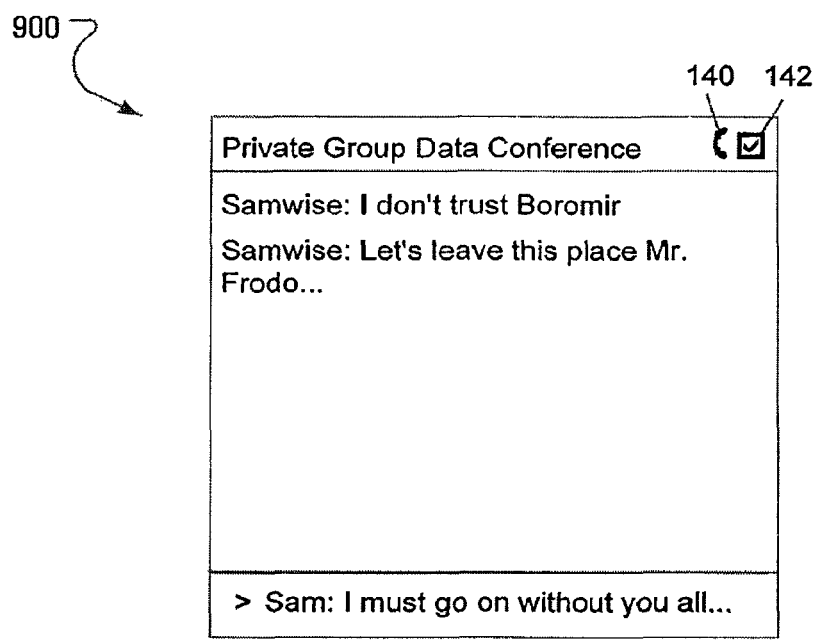
FIG. 9 illustrates a Private Group Data Conference user interface screen for the same device for which the IM Conference Groups user interface screen is presented in FIGS. 4A, 4B and 6.

FIG. 9 illustrates a Private Group Data Conference screen 900 that may appear on the same device for which the IM Conference Groups status screen 400 is presented in FIGS. 4A, 4B and 6 and for which the Travel Group Data Conference screen 500 is presented in FIGS. 5A and 5B. Although the user of this device may have initiated, and may be participating in, a Voice Mode IM conversation with the Travel Group, if the device is a Class A device, the user may also initiate and participation in a data session with the Private Group. When using a dual-mode mobile device that allows for simultaneous voice connection and data connection, execution of aspects of the invention allows for participation in two different IM conversations in two different modes. As mentioned earlier, devices that can operate in Data Mode and Voice Mode simultaneously includes GSM Class A devices and a UMTS devices, including W-CDMA devices.

In the status line of the Private Group Data Conference screen 900 there is a phone icon 140 and a check-box indicator 142 to indicate that there is a Voice Mode IM conversation in progress at the moment. During this time, the user is provided with an ability to participate (speak and listen) in the Voice Mode IM conversation with the Travel Group and participate (type and read) in the Data Mode IM conversation with the Private Group.

Figure 10:
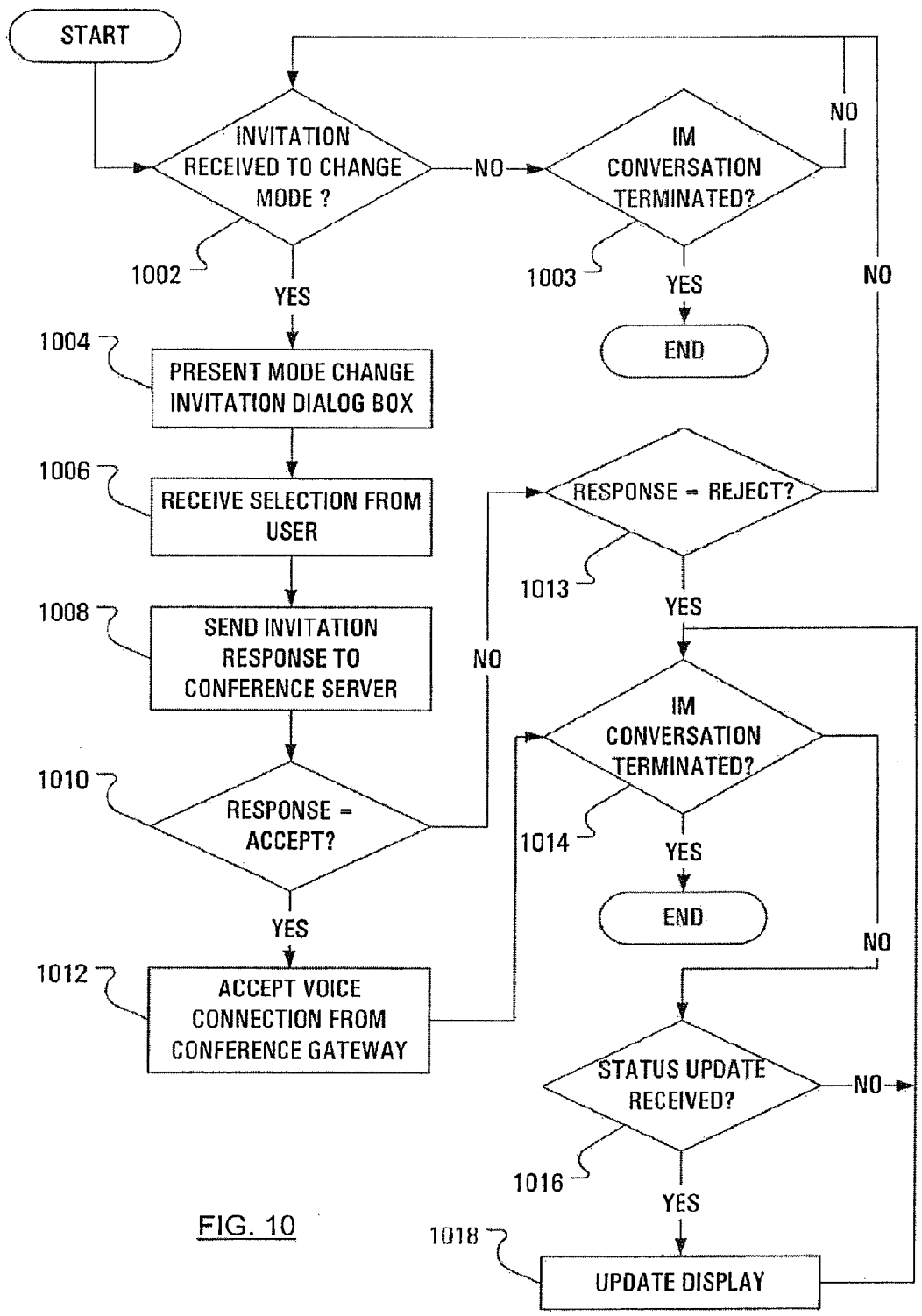
FIG. 10 illustrates steps in an IM conversation mode change method executed at a dual-mode mobile communication device according to an embodiment of the present invention.

FIG. 10 illustrates steps for handling a IM conversation mode change at a dual-mode mobile device 30 in a Data Mode IM conversation. At first, it may be assumed that the dual-mode mobile device 30 is participating in a Data Mode IM conversation with at least one other participant. A user of the dual-mode mobile device 30 may instruct the IM client application executed on the dual-mode mobile device 30 to send a mode change request to the audio conference gateway 40 to change the existing Data Mode IM conversation to a Voice Mode IM conversation. As stated herein before, the dual-mode mobile device 30 may be preloaded with the address of the audio conference gateway 40. Alternatively, a generic reference to the audio conference gateway 40 may be converted to the address of the conference gateway at the wireless gateway 24. As illustrated in FIG. 5B, sending such a mode change request to the audio conference gateway 40 to change to a Data Mode IM conversation to a Voice Mode IM conversation may be accomplished through the selection of a menu item.

The dual-mode mobile device 30 may periodically determine whether an invitation to change mode has been received (step 1002). If the dual-mode mobile device 30 does not receive an invitation to change mode, the IM client application may simply continue to maintain a presence in the Data Mode IM conversation until the IM conversation is determined (step 1003) to have been terminated. The ability to terminate an IM conversation may be provided only to the initiator of the IM conversation or, in some embodiments, may be provided to any of the participants in the IM conversation. However, such IM conversation termination is expected to be known by practitioners in the art and is, therefore, outside the scope of this application.

In response to receiving the mode change request, which may be considered to specify, among other devices, the dual-mode mobile device 30 executing the method of FIG. 10, the audio conference gateway 40 may send an invitation to change mode to the dual-mode mobile device 30. The dual-mode mobile device 30 executing the method of FIG. 10 may recognize (step 1002) that an invitation to change mode has been received and, in response, present (step 1004) the mode change invitation dialog box 120 (see FIGS. 8A, 8B).

Upon receiving (step 1006), from the user, an indication of a selection of one of the Accept button 121, the Reject button 122 or the Ignore button 123 (see FIG. 8A), the IM client application may control the dual-mode mobile device 30 to send an indication of the selection in a response to the audio conference gateway 40 (step 1008).

If it is determined (step 1010) that the Accept button 121 was selected, the dual-mode mobile device 30 may anticipate and subsequently accept (step 1012) a voice connection from the audio conference gateway 40.

If it is determined (step 1010) that the Reject button 122 or the Ignore button 123 was selected, the dual-mode mobile device 30 may determine whether the Reject button 122 was selected (step 1013). By elimination, a determination that the Reject button 122 was not selected may lead the dual-mode mobile device 30 to decide that the Ignore button 123 was selected. As such, the dual-mode mobile device 30 may return to periodically determining whether an invitation to change mode has been received (step 1002).

If it is determined (step 1010) that the Reject button 122 was selected, the dual-mode mobile device 30 may simply maintain the existing data connection and maintain participation in the Data Mode IM conversation, even though further traffic in the Data Mode IM conversation is unlikely. This maintenance may continue until it is determined (step 1014) that the Data Mode IM conversation, or the Voice Mode IM conversation with which the Data Mode IM conversation is associated, has been terminated.

Meanwhile, devices associated with other group members may be sending invitation responses to the audio conference gateway 40, responsive to which the audio conference gateway 40 may establish voice connections to voice-capable devices with which the group members are associated. After establishing each such voice connection, the audio conference gateway 40 may send an update message to all the devices that have joined the Voice mode IM conversation to indicate acceptance of the mode change invitation at the devices (see FIG. 11).

The IM client application may recognize that a status update has been received (step 1016) and update (step 1018) the IM Conference Groups status screen accordingly. As there may be devices participating in the IM conversation, many status updates may be received from the audio conference gateway 40. Notably, it may be that such status updates are received over the voice connection with the audio conference gateway 40.

As discussed, the invitation to join the ongoing IM conversation in Voice Mode may simply arrive at a dual-mode mobile device in the form of a telephone call from the audio conference gateway 40. In such a case, steps 1004, 1006, 1008 and 1010 may be considered unnecessary.

Figure 11:
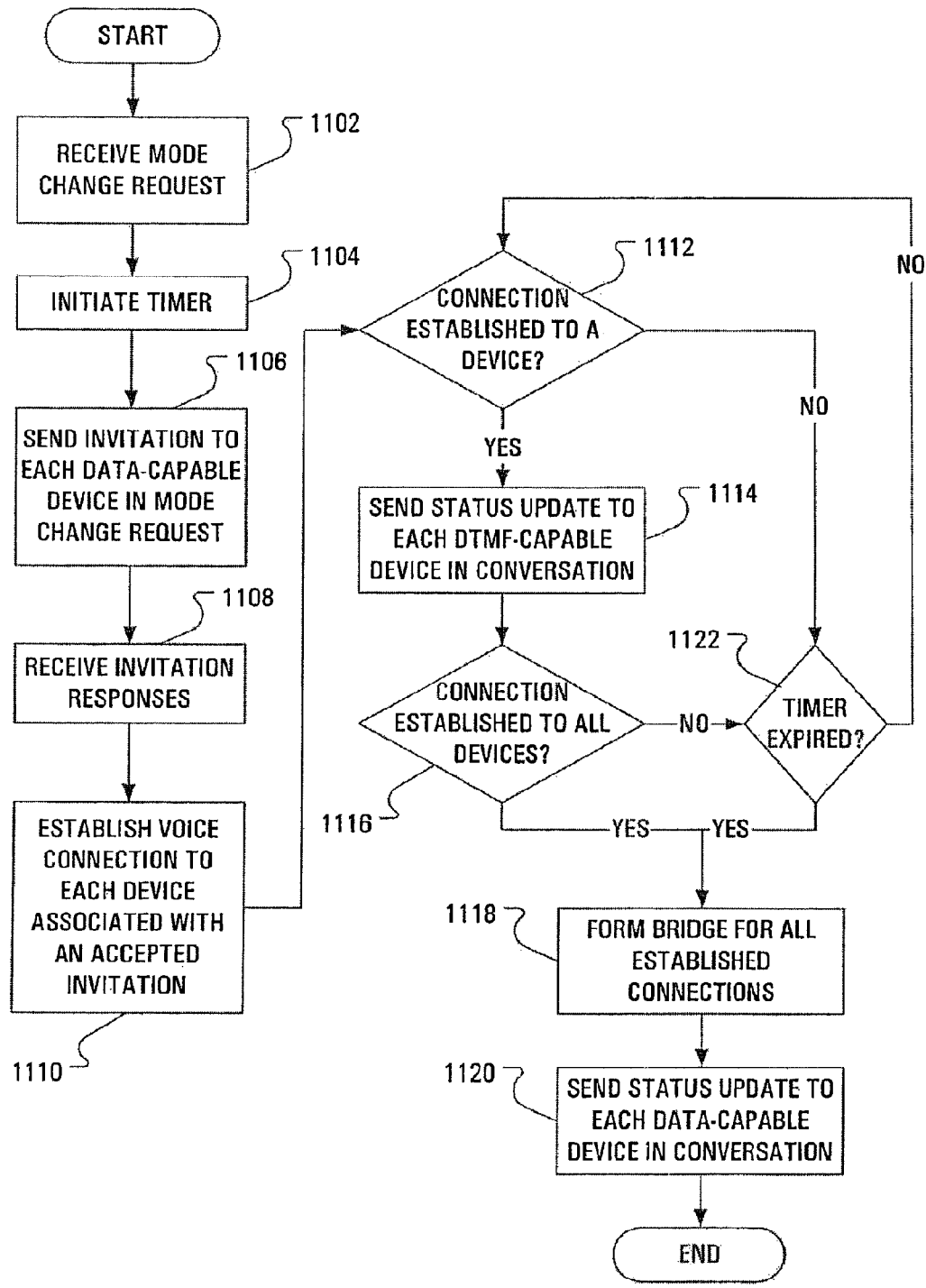
FIG. 11 illustrates steps in an IM conversation mode change method executed at a conference gateway according to an embodiment of the present invention.

The steps of a method of managing a mode change at the audio conference gateway 40 are presented in FIG. 11. Initially, the audio conference gateway 40 receives a mode change request data packet (step 1102). The audio conference gateway 40 may then initiate a timer (step 1104) and send a mode change invitation (step 1106) to each of the data-capable devices associated with voice-capable devices identified in the mode change request. Responses to the invitations may then be received by the audio conference gateway 40 (step 1108) and used to determine which of the devices is associated with an acceptance of the invitation. The audio conference gateway 40 may then attempt to establish a voice connection (step 1110) to each of the voice-capable devices associated with data-capable devices that have sent responses indicating acceptance of the mode change invitation. In an exemplary embodiment of the invention, the audio conference gateway 40 may establish an exemplary voice connection by placing a telephone call specifying a telephone number of a voice-capable device, where the telephone number has been provided in the mode change request. As will be readily understood, in the case of the dual-mode mobile devices 30, the voice-capable device associated with the data-capable device that sent a response indicating acceptance of the mode change request are the same device. In contrast, in another case, a voice-capable device (the exemplary landline telephone station apparatus 44) may be associated with a separate data-capable device (the first landline-based PC 10A).

Responsive to determining (step 1112) that a voice connection has successfully been established to a device, the audio conference gateway 40 may send a status update (step 1114) to each voice-capable device with which a voice connection has been established. The status update may, for instance, identify a group member associated with the voice-capable device with which a voice connection has been established.

As stated previously, if a voice connection has been established to a given device, status updates may be provided in-band using DTMF signals. Alternatively, and without regard for whether a voice connection has been established, status updates may be provided out-of-band using the pre-existing data connection between the IM server 14 and the given device. As such, status updates may be provided by the conference gate way 40 to the IM server 40.

In the case wherein the status update is sent using DTMF signals, some of the voice-capable devices may not be configured to receive or understand DTMF signals. For instance, the second landline-based PC 10B may be considered a voice-capable device when employing the known H.323 protocol for a voice channel connection to the audio conference gateway 40. However, the second landline-based PC 10B may not be configured to receive or understand DTMF signals. Such information about whether a voice-capable device is configured to receive or understand DTMF signals may be provided to the audio conference gateway 40 in a field in the mode change request data packet.

It may then be determined (step 1116), by the audio conference gateway 40, whether a voice connection has been established to all voice-capable devices that are associated with data capable devices that accepted the mode change invitation along with voice-capable devices identified in the mode change request but not associated with data capable devices. If it is determined that not all voice connections have been established, it is determined (step 1122) whether the timer initiated in step 1104 has been allowed to run down to zero. If it is determined that the timer has not been allowed to run down to zero, it is determined whether another voice connection has been successfully established (step 1112).

If it is determined that the timer has been allowed to run down to zero, or all necessary voice connections have been established, the audio conference gateway 40 may form a bridge (step 1118) of the established voice connections. Such bridge formation is assumed to be well known in the conferencing arts and, consequently, will not be discussed in detail here.

Upon successful bridge formation, the audio conference gateway 40 may once again send a status update (step 1120) to each of the voice-capable devices associated with the Voice Mode IM conversation.

While the sending of a final status update (step 1120) represents a final step in the method of FIG. 11, it should be clear that the method is merely directed to the handling of a mode change request and that the audio conference gateway 40 may continue to operate to support the Voice Mode IM conversation until the Voice Mode IM conversation is terminated. Notably, termination of the Voice Mode IM conversation may not necessarily mean termination of the Data Mode IM conversation. Those members of the group that wish to continue the Data Mode IM conversation after the termination of the Voice Mode IM conversation may be allowed to pick up the Data Mode IM conversation at the point at which the Data Mode IM conversation was forsaken in favor of the Voice Mode IM conversation.

Advantageously, dependent upon the implementation, the formation of a Voice Mode IM conversation by requesting the audio conference gateway 40 to establish voice connections and bridge the established voice connections rather than forming a Voice Mode IM conversation through the IM server 14 may allow for backward compatibility with standard PSTN-connected telephones. Additionally, the voice quality may not be limited by the bandwidth of the data connection over which a voice channel may be established when a Voice Mode IM conversation is handled by the IM server 14.

Additionally, although the voice channel (when established) is separate and distinct from the data channel, the disclosed handling of the receipt of a call associated with a group having an ongoing Data Mode IM conversation may allow the user interface to change only slightly, thereby confirming the relationship between the two IM conversations. Management of status updates at a user interface in an IM client application, where the user interface is carried over from the user interface employed in the Data Mode IM conversation, may be arranged to clear the Data Mode check box indicators 64D upon establishment of a voice channel to the audio conference gateway 40 and re-display the Voice Mode check box indicators 64V associated with members of the group as status updates are received that indicate that devices associated with the members have established voice channels with the audio conference gateway 40.

In an alternative embodiment, rather than initiate a conference call based on potential participants identified as being members in an IM group, a user of a dual-mode mobile device 30 may initiate a conference call based on potential participants identified as being related to (originator, receivers) a given e-mail message.

Figure 12:
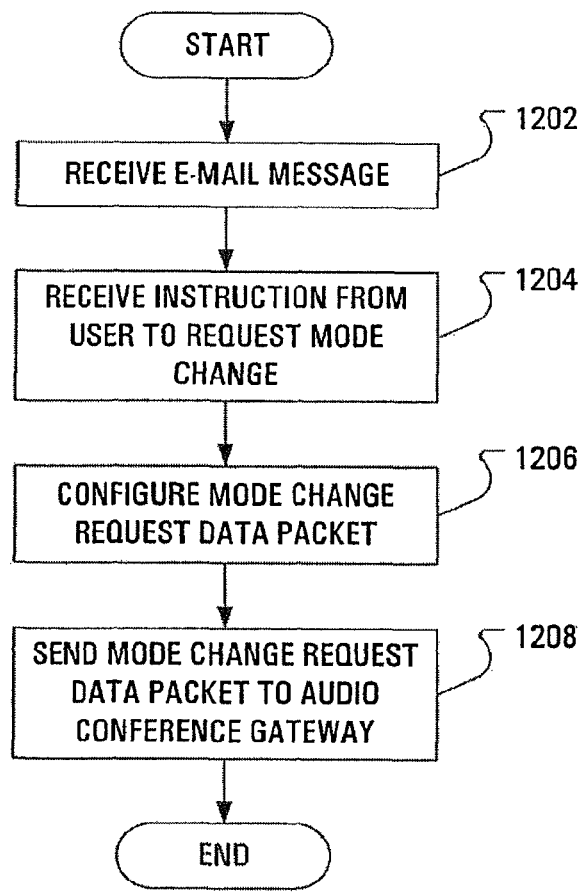
FIG. 12 illustrates steps in conference call setup request method executed at a dual-mode mobile device according to an embodiment of the present invention.

FIG. 12 illustrates steps taken by an e-mail client application on the dual-mode mobile device 30 in the course of requesting the setup, at the audio conference gateway 40, of a conference call related to a received e-mail message. Initially, an e-mail message is received (step 1202). The e-mail message may be assumed to identify a source e-mail address (e.g., in a "FROM" field), one or more destination e-mail addresses (e.g., in a "TO" field), one or more carbon copy e-mail addresses (e.g., in a "CC" filed) and one or more blind carbon copy e-mail addresses (e.g., in a "BCC" field).

Figure 13A:
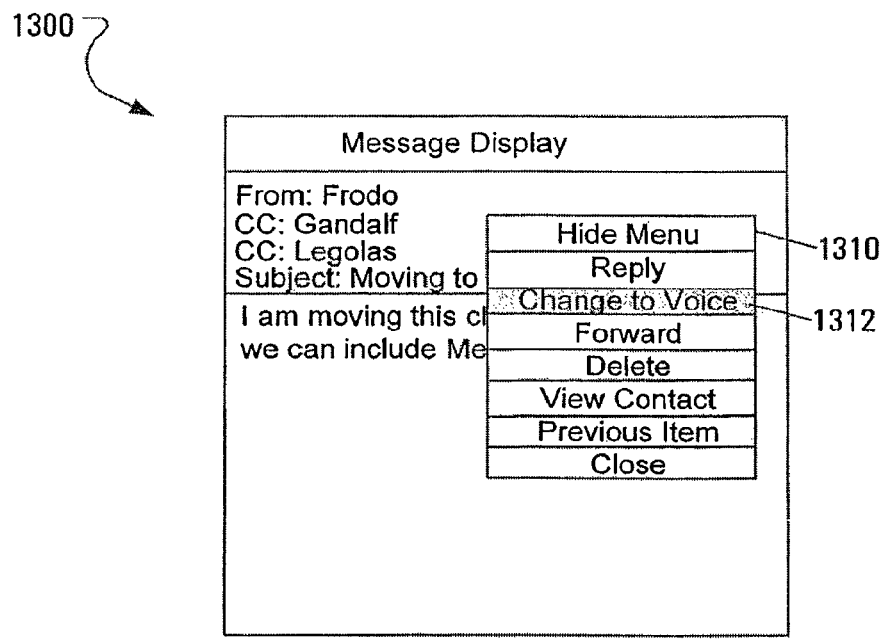
FIG. 13A illustrates an exemplary Message Display user interface screen with a menu according to an embodiment of the present invention.

FIG. 13A illustrates a Message Display 1300 for displaying a received e-mail message to a user of the dual-mode mobile device 30. While displaying the e-mail message, or, perhaps, just some limited portion of information related to the e-mail message such as the time of receipt, the source and the subject, the e-mail client application may, upon receiving appropriate input from the user, present a Message Display menu 1310 of options to the user. The options may include actions related to the displayed e-mail message, where one of the actions may be a "Change to Voice" option 1312. Selection of the Change to Voice option 1312 may be interpreted by the e-mail client application as an instruction from the user to request a conference call with the parties identified in the e-mail message. Upon receiving this instruction (step 1204) from the user, the e-mail client application may configure a mode change request data packet (step 1206).

To configure the mode change request data packet, the e-mail client application may extract contents (e-mail addresses) of the various fields ("TO", "FROM") of the e-mail message. The e-mail client application may then consult a database of contact information stored on the dual-mode mobile device 30. Based on an association between the e-mail addresses extracted from the various fields of the e-mail message and corresponding records in the database, the e-mail client application may extract information from the corresponding records for use in configuring the mode change request data packet.

Once configured, the e-mail client application may transmit the mode change request data packet to the audio conference gateway 40 through the wireless gateway 24.

The audio conference gateway 40 may not have awareness of whether a recently received mode change request data packet was configured based on a Data Mode IM conversation or based on an e-mail with multiple recipients. As such, the actions of the audio conference gateway 40 responsive to receiving the mode change request data packet are not likely to differ from that which has been disclosed above. That is, the audio conference gateway 40 may send invitations to data-capable devices associated with potential participants, may receive invitation responses, may establish voice connections to voice-capable devices associated with potential participants and may bridge established voice connections.

Figure 13B:
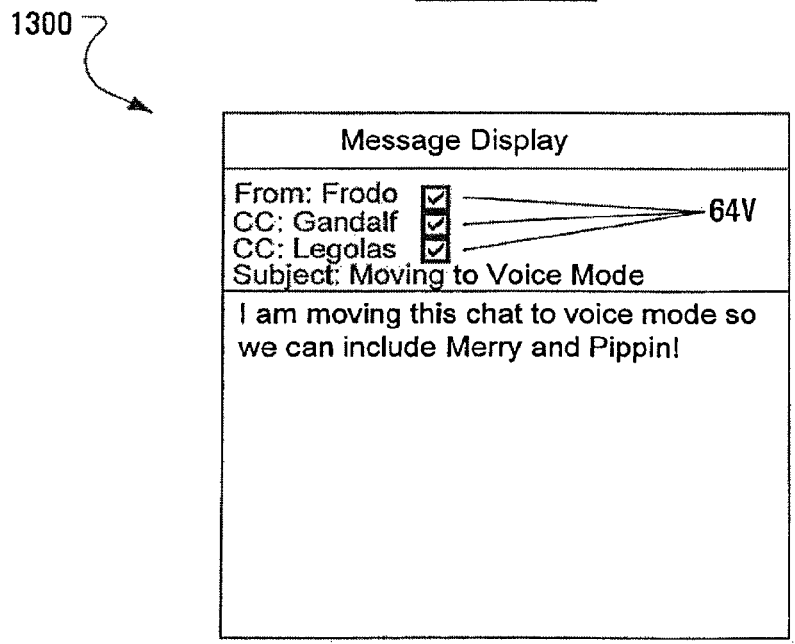
FIG. 13B illustrates the exemplary Message Display user interface screen of FIG. 13A with voice mode check box indicators according to an embodiment of the present invention.

The audio conference gateway 40 may also send status updates over established voice connections using DTMF signals. At the dual-mode mobile device 30, the e-mail client application may interpret the status updates received from the audio conference gateway 40 and alter the display of the e-mail message to place Voice Mode check box indicators 64V (see FIG. 13B) beside the e-mail address (or display name) of each recipient of the e-mail message that has joined the conference call, i.e., each recipient of the e-mail message associated with a voice-capable device to which a voice connection has been established.

In a further alternative embodiment of the invention, rather than initiate a conference call based on potential participants identified as being related to an e-mail message, a user of a dual-mode mobile device 30 may initiate a conference call based on potential participants identified (e.g., through extraction of field contents) as being related to (originator, receiver) a given Short Message Service (SMS) message. Advantageously, the originator (in the "FROM" field) and receiver (in the "TO" field") of an SMS message are typically identified by telephone directory number. As such, no step of consulting a contact database is required when determining the telephone directory numbers to include in the mode change request data packet sent to the audio conference gateway 40.

Other modifications will be apparent to those skilled in the art and, therefore, the invention is defined in the claims.

What is claimed is:

1. A method for creating a graphical user interface, the method performed by a mobile device comprising a processor and a memory encoded with program instructions that, when executed by the processor cause the mobile device to perform the method, the method comprising:
presenting on a display of the mobile device a plurality of group names each associated with a conference of a plurality of conferences;
determining a status for each of the plurality of conferences, and
indicating on the display for each of the plurality of group names a status of the associated conference, wherein at least one conference status is voice mode and at least one conference status is data mode.

2. The method of claim 1, further comprising:
determining connection capabilities of each of one or more conference participants, wherein the connection capabilities include data mode, voice mode, or both data and voice mode; and
presenting on the display an expanded group name including the one or more conference participants and one or more icons indicative of the determined connection capabilities for each of the one or more conference participants.

3. The method of claim 2, further comprising:
presenting on the display the expanded group name further including one or more potential conference participants and for each potential conference participant presenting on the display an icon indicative of voice mode.

4. The method of claim 1, further comprising:
presenting a first menu on the display including an open session command, that when executed opens a session associated with a first group name, of the plurality of group names.

5. The method of claim 4, wherein the session is an instant messaging session.

6. The method of claim 5, further comprising:
presenting on the display the instant messaging session including at least a portion of one or more text based messages;
presenting a second menu on the display including a change to voice option, that when executed causes the mobile device to generate and send a change request to an audio conference gateway;
establishing a voice connection with the audio conference gateway as part of a voice conference; and
updating the status of the first group name to indicate voice mode.

7. The method of claim 6, wherein the at least one of one or more potential conference participants become participants in the voice conference.

8. The method of claim 6, wherein said voice connection is a public switched telephone network (PSTN) connection.

9. The method of claim 1, wherein status for each of the conferences are selected from a group consisting of: inviting, invited, accepting, accepted, data mode, voice mode, idle, closing, and closed.

10. A mobile device for creating a graphical user interface, the device comprising:
a processor;
a display; and
a memory storing computer instructions which, when executed by the processor, cause the mobile device to perform a method, the method comprising:
presenting on the display of the mobile device a plurality of group names each associated with a conference of a plurality of conferences,
determining a status for each of the plurality of conferences, and
indicating on the display for each of the plurality of group names a status of the associated conference, wherein at least one conference status is voice mode and at least one conference status is data mode.

11. The device of claim 10, wherein the memory is further encoded with executable program instructions that, when executed by the processor cause the processor to perform a method further comprising:
determining connection capabilities of each of one or more conference participants, wherein the connection capabilities include data mode, voice mode, or both data and voice mode; and
presenting on the display an expanded group name including the one or more conference participants and one or more icons indicative of the determined connection capabilities for each of the one or more conference participants.

12. The device of claim 11, wherein the memory is further encoded with executable program instructions that, when executed by the processor cause the processor to perform a method further comprising presenting on the display the expanded group name further including one or more potential conference participants and for each potential conference participant presenting on the display an icon indicative of voice mode.

13. The device of claim 10, wherein the memory is further encoded with executable program instructions that, when executed by the processor cause the processor to perform a method further comprising presenting a first menu on the display including an open session command, that when executed opens a session associated with a first group name, of the plurality of group names.

14. The device of claim 13, wherein the session is an instant messaging session.

15. The device of claim 14, wherein the memory is further encoded with executable program instructions that, when executed by the processor cause the processor to perform a method further comprising:
   presenting on the display the instant messaging session including at least a portion of one or more text based messages;
   presenting a second menu on the display including a change to voice option, that when executed causes the mobile device to generate and send a change request to an audio conference gateway;
   establishing a voice connection with the audio conference gateway as part of a voice conference; and
   updating the status of the first group name to indicate voice mode.

16. The device of claim 15, wherein the at least one of one or more potential conference participants become participants in the voice conference.

17. The device of claim 15, wherein said voice connection is a public switched telephone network (PSTN) connection.

18. The device of claim 15, wherein status for each of the conferences are selected from a group consisting of: inviting, invited, accepting, accepted, data mode, voice mode, idle, closing, and closed.

19. A graphical user interface stored on one or more non-transitory computer readable mediums storing computer instructions which, when executed by a processor, cause the mobile device to present the graphical user interface on a display, the graphical user interface comprising:
   a plurality of group names each associated with a conference of a plurality of conferences; and
   an indication on the display for each of the plurality of group names of a status of the associated conference, wherein at least one conference status is voice mode and at least one conference status is data mode.

* * * * *